United States Patent
Leivesley et al.

(10) Patent No.: US 9,175,931 B2
(45) Date of Patent: *Nov. 3, 2015

(54) PRESSURE IMPULSE MITIGATION

(75) Inventors: Sally Leivesley, Auckland (NZ); Anthony Green, Auckland (NZ); Tim Sampson, Auckland (NZ)

(73) Assignee: FLEXIBLAST PTY LTD., Woolloongabba (AU)

( * ) Notice: Subject to any disclaimer, the term of this patent is extended or adjusted under 35 U.S.C. 154(b) by 2044 days.

This patent is subject to a terminal disclaimer.

(21) Appl. No.: 11/914,736

(22) PCT Filed: May 23, 2006

(86) PCT No.: PCT/GB2006/001884
§ 371 (c)(1),
(2), (4) Date: Jun. 2, 2008

(87) PCT Pub. No.: WO2006/125969
PCT Pub. Date: Nov. 30, 2006

(65) Prior Publication Data
US 2008/0282876 A1    Nov. 20, 2008

(30) Foreign Application Priority Data

May 23, 2005  (GB) .................... 0510490.6

(51) Int. Cl.
*F41H 5/04* (2006.01)
*A62D 5/00* (2006.01)
(Continued)

(52) U.S. Cl.
CPC ............... *F41H 5/0492* (2013.01); *A62D 5/00* (2013.01); *B32B 3/30* (2013.01); *B32B 5/16* (2013.01); *B32B 5/30* (2013.01); *B32B 9/02* (2013.01); *B32B 27/14* (2013.01); *B32B 27/36* (2013.01); *F42D 5/045* (2013.01); *B32B 2264/107* (2013.01); *B32B 2307/3065* (2013.01); *B32B 2307/54* (2013.01); *B32B 2307/546* (2013.01); *B32B 2307/558* (2013.01); *B32B 2307/56* (2013.01); *B32B 2307/714* (2013.01);
(Continued)

(58) Field of Classification Search
CPC .................................. F41H 5/02; C08L 89/00
USPC ........ 89/36.02, 36.05; 442/135; 428/920, 921
See application file for complete search history.

(56) References Cited

U.S. PATENT DOCUMENTS

| 3,202,556 A | 8/1965 | Chrisp |
| 3,301,723 A | 1/1967 | Chrisp |

(Continued)

FOREIGN PATENT DOCUMENTS

| EP | 0 251 606 A2 | 1/1988 |
| EP | 0 465 442 A2 | 1/1992 |

(Continued)

OTHER PUBLICATIONS

International Preliminary Report on Patentability from PCT/GB2006/001884.

*Primary Examiner* — Lynda Salvatore
(74) *Attorney, Agent, or Firm* — Knobbe, Martens Olson & Bear, LLP

(57) ABSTRACT

A pressure impulse mitigating barrier which includes a water gel sheet having an array of protrusions formed from the water gel; and/or a layer having a plurality of disruptor particles is provided. Such a structure may protect an entity from the effects of pressure impulse, e.g. from damage caused by projectiles or from explosive blast.

17 Claims, 4 Drawing Sheets

(51) Int. Cl.
*B32B 3/30* (2006.01)
*B32B 5/16* (2006.01)
*B32B 5/30* (2006.01)
*B32B 9/02* (2006.01)
*B32B 27/14* (2006.01)
*B32B 27/36* (2006.01)
*F42D 5/045* (2006.01)

(52) U.S. Cl.
CPC . *B32B2307/7145* (2013.01); *B32B 2307/7265* (2013.01); *B32B 2419/00* (2013.01); *B32B 2437/00* (2013.01); *B32B 2509/00* (2013.01); *B32B 2553/02* (2013.01); *B32B 2571/02* (2013.01); *B32B 2605/00* (2013.01); *B32B 2605/18* (2013.01)

(56) References Cited

U.S. PATENT DOCUMENTS

| | | | |
|---|---|---|---|
| 3,398,007 A | | 8/1968 | Pillersdorf et al. |
| 4,008,110 A | | 2/1977 | Machacek |
| 4,246,146 A | * | 1/1981 | Wood et al. .......... 524/14 |
| 5,604,168 A | * | 2/1997 | Libor ................ 516/103 |
| 5,686,161 A | * | 11/1997 | Cullen et al. ........... 428/68 |
| 5,935,593 A | | 8/1999 | Ron et al. |
| 6,139,935 A | * | 10/2000 | Cullen et al. ........... 428/68 |
| 7,861,637 B2 | | 1/2011 | Leivesley |
| 2009/0104422 A1 | * | 4/2009 | Sampson ............. 428/220 |

FOREIGN PATENT DOCUMENTS

| | | |
|---|---|---|
| EP | 0 488 465 A1 | 6/1992 |
| EP | 1 229 298 A1 | 8/2002 |
| FR | 2 459 956 | 1/1981 |
| GB | 2 100 845 A | 1/1983 |
| GB | 2 262 885 A | 7/1993 |
| WO | WO 02/29351 | 4/2002 |
| WO | WO 2004/044520 A1 | 5/2004 |
| WO | WO 2005/035607 A1 | 4/2005 |
| WO | WO 2005/052500 A1 | 5/2005 |
| WO | WO 2005/100903 A1 | 10/2005 |

* cited by examiner

PRESSURE IMPULSE MITIGATION

RELATED APPLICATIONS

This application is a U.S. National Phase of International Application No. PCT/GB2006/001884, filed May 23, 2006, designating the U.S. and published in English on Nov. 30, 2006, as WO 2006/125969, which claims the benefit of British Application No. 0510490.6, filed May 23, 2005.

Field of the Invention

This invention relates to a new material to be used as a pressure mitigant, e.g. as a barrier to protect windows. In particular, the invention relates to the use of water gels to form a material which can mitigate the consequences of an explosion and/or damage caused by projectiles.

Background of the Invention

Since the mid 1990's there has been an increase in the use of explosives by criminal organisations against civilian and military targets throughout the World. Their use results in death, injury and destruction of property and buildings. Previously, mitigation of explosion relied upon intelligence and police detection to provide warning of impending attack but recent events make it clear that intelligence and police operations alone cannot be relied upon to prevent explosions. Moreover, some explosions are caused simply by accident, e.g. gas or chemical explosions, and it would be useful if the consequences of such accidental explosions could also be minimised.

Conventional construction can give rise to buildings which will withstand many types of impact but it is still difficult to minimise the effects of explosions. Of particular importance and concern are the windows especially in high rise buildings. Windows are a major cause of trauma and injury caused by explosions; the fragmentation of pieces of glass not only causes death but many other permanent injuries such as loss of eyesight, organ trauma etc.

It is well known therefore for buildings and in particular windows to be protected against explosion damage by materials which mitigate their effects.

One option for minimising the problem of glass fragmentation utilises an adhesive film made of a polyester composite material which can be applied to the inside of a window to contain glass fragments. Such films do not however prevent injury caused by fragments of masonry from cladding or from fragments falling from a height.

Recently, pressure impulse mitigation has been significantly improved by the use of blast net curtains and by the retrofitting of laminated glass. However, whilst net curtains provide some protection against fragmentation from glass they do not protect building integrity. Also, laminated glass cannot be used higher than about 7 storeys since it falls in total window size, i.e. does not fragment. This is potentially lethal to those in the street below.

There remains a need therefore for novel classes of pressure mitigation materials to be designed, which overcome the limitations of any of the present generation of such materials and in particular to provide protection against zero warning explosions. Moreover, with the increase in criminal activity, the use of pressure impulse mitigation materials in construction may become common place and hence there remains a need to devise cheap, low-toxicity materials for pressure impulse mitigation.

The present inventors have surprisingly found that certain mixtures of water and gels (in particular cross-linked water gels) are particularly suitable for use as barriers/shields to prevent damage caused by explosions. The inventors have surprisingly found that water gels can be formed into structures which can withstand significant over-pressures compared with materials currently used in buildings. Without wishing to be limited by theory, it is envisaged that the inherent elasticity of the water gel makes it an excellent material for absorbing the shockwave of an explosion whilst retaining its structural integrity. Moreover, the aqueous nature of the water gel ensures that it is also capable of resisting heat and quenching flame, in particular in the immediate aftermath of an explosion.

In addition, it has surprisingly been found that the water gels mitigate damage caused by projectiles such as shrapnel or bullets. The water gels are able to absorb the shockwave created by the projectile through their elasticity whilst also acting to slow and potentially stop the projectile via friction effects throughout the gel bulk. The water gels therefore also serve to protect against damage from projectiles and are hence of use as bullet proof materials.

Water gels are not themselves new. Simple mixtures of water and gelatin have been known for may years but never before have they been suggested for use in pressure impulse mitigation. Cross-linked water gels have been used to deliver bio-molecules and pharmaceuticals either in the form of a biologically degradable capsule or in the form of a matrix from which the active molecule is released during proteolysis in vivo. Amongst the most frequently cited cross linking reagents in this regard is glutaraldehyde (pentane-1,5-dial), which has the chemical formula $C_5H8O2$ (see Yamamoto et al., (2000) J. Control. Rel. 133-142; Tabata Y., and Yoshito, I., (1989) Pharma Res., Vol 6, 422-427).

Never before however, have these structures been suggested for use in pressure impulse mitigation.

The use of water gels alone may not be sufficient to withstand particularly high pressures e.g. from very large explosions or from high velocity or armour piercing projectiles so the inventors have been searching for further ways in which the strength of a water gel barrier can be improved. The inventors have now found that the water gels can be shaped and/or used in conjunction with disruptor particle layers to provide even more protection against pressure impulse. Thus, by forming the water gel into a particular shape and/or by embedding within the water gel layers a plurality of disruptor particles, the resulting composition exhibits remarkable pressure impulse mitigation.

SUMMARY OF INVENTION

Thus, viewed from one aspect the invention provides a pressure impulse mitigating barrier comprising a water gel layer, e.g. a cross-linked water gel layer, and a layer comprising a plurality of disruptor particles, e.g. a layer of ceramic spheres.

Viewed from another aspect the invention provides a pressure impulse mitigating barrier comprising a water gel sheet, e.g. a cross-linked water gel sheet, said sheet comprising an array of protrusions, e.g. hemispherical protrusions, formed from said water gel.

Viewed from a further aspect, the invention provides a pressure impulse mitigating barrier comprising a water gel sheet said sheet comprising an array of protrusions formed from said water gel and a layer comprising a plurality of disruptor particles.

Viewed from another aspect the invention provides a method for protecting an entity, e.g. a structure or organism, from the effects of an explosion or from the effects of contact with a projectile comprising covering at least a part, preferably at least 10% thereof, e.g. all of said entity in a barrier as hereinbefore described.

By pressure impulse mitigation is meant, inter alia, that at least one of the effects, preferably all of the effects of an explosive blast, e.g. fragmentation or collapse of buildings or glass, translation of objects within the building and primary and secondary effects of fire are reduced.

Pressure impulse mitigation also covers mitigating the effects of contact with a projectile, i.e. mitigating the potential damage caused by a projectile or in the mitigation of projectile induced damage. The projectile may be, for example, a bullet, missile, shrapnel, space debris etc. A pressure impulse mitigating barrier is therefore capable of mitigating these effects.

By entity is meant anything which should be protected from the impact of an explosion or from damage by a projectile, e.g. structures, organisms and the general physical environment.

An organism is a living plant or animal, e.g. a human. By structure is meant any inanimate object which could be protected from explosive damage such as buildings (temporary or permanent), industrial plant, civil infrastructure, vehicles, military equipment, computers etc.

By array of protrusions means a plurality of protrusions, preferbly regularly arranged.

By disruptor particles is meant irregular or preferably regular shaped particles, e.g. spheres of solid material, which can be used in conjunction with the water gel layer to form an even stronger barrier.

By water gel is meant a mixture of water and a gel which forms an elastomeric barrier. The gel should preferably be low-toxicity and cheap to manufacture or isolate. It should exhibit elastomeric properties, have a high elastomeric modulus and a high ductility.

Suitable gels include gelatin, gellan gum gels, poly (gamma-benzyl-L-glutamate) (PBLG), agar (preferably composed of 70% agarose, a gel saccharide and 30% agaropectin), collagen, protein gels, polysaccharide gels, keratin gels, hydrogels, ormosils (organically modified silicates often of formula $(R'_nSi(OR)_{4-n}$ in which R is typically an alkyl group and R' an organic group), sol-gels, hydrophilic polymer gels, and glycoprotein gels. Other suitable gels include biogels such as carrageenans, pectins, chitosan (e.g. deacylated chitin), alginates (e.g. xanthan alginates casein), seed gums, an egg protein gel and Gelacrimide gels. Mixtures of gels can be employed.

These gels can be obtained from commercial sources. A preferred gel is gelatin. The gelatin preferably has a molecular weight range of 20,000 to 300,000 D, e.g. 20,000 to 150,000 D and can be made from the hydrolysis of collagen.

The water gel mixture may be cross-linked. Suitable agents to effect the cross-linking of the gels are multifunctional molecules, e.g. bi, tri or tetrafunctional molecules, capable of linking the polymer chains of the gel in question. The reactive functionalities on the cross-linking agent are conveniently the same and these can be separated by spacer groups. Such a spacer group may preferably comprise a chain of 1 to 20 atoms, optional interrupted by heteroatoms such as O, N, P or S, e.g. an alkylene chain, linking the reactive functional groups. Suitable reactive cross-linking functional groups are well known and include aldehydes, esters (in particular N-hydroxy succinimide esters and imidoesters), amines, thiols, hydroxyls, acid halides, vinyls, epoxides and the like.

Thus, cross-linking agents may be of general formula (I)

wherein each X independently represents the residue of an aldehyde (i.e. —COH), the residue of an ester (i.e. —COOR) in particular N-hydroxy succinimide esters and imidoesters (—CNOR), amine, thiol, hydroxyl, acid halide or vinyl and Sp is a spacer group comprising a chain of 1 to 100 atoms in its backbone, preferably 1 to 50, more preferably 1 to 20, e.g. 4 to 12 atoms, especially 5 to 10 atoms. X may also be epoxide. The group R can be any group which allows the formation of an ester which is preferably labile. R may therefore be a C1-20 alkyl, an optionally substituted N-hydroxy succinimide group and so on.

Alternatively, the cross-linking agent may be a multifunctional species of formula (II)

wherein X and Sp are as hereinbefore defined, Y is a carbon atom, C—H or a heteroatom such as a nitrogen or phosphorus atom and n is 3 to 5. Obviously, the value of n varies depending on the nature of the Y atom employed as will be readily understood by the person skilled in the art. Thus when Y is C then n is 4. If Y is C—H then n is 3.

Preferred groups X are electrophilic functional groups such as esters, carboxylic acids or aldehydes or nucleophilic groups such as amines and hydroxyls.

Whilst the X groups may be different, especially preferably, all X groups are the same and are selected from aldehydes and esters, in particular imidoesters or N-hydroxy succinimidyl esters.

The spacer chain is preferably substantially linear and is formed primarily of carbon atoms which can be interupted by heteroatoms such as oxygen, nitrogen and sulphur. By substantially linear is meant that the spacer arm is free from branched side chains of three atoms or above, i.e. the spacer may carry short chain branches like methyl or ethyl groups.

The spacer chain is preferably linear (i.e. free of branches) and is preferably formed from a carbon atom backbone, e.g. a $C_{1-40}$ carbon backbone, preferably $C_{1-20}$ alkylene chain (e.g. methylene or a $C_{7-9}$ alkylene chain).

The backbone may contain one or more aryl groups such as phenyl or benzyl in its length, (e.g. two aryl groups), preferably linked through the 1 and 4 positions of the ring. As mentioned above, the backbone may be interupted by heteroatoms, e.g. oxygen or nitrogen, to form for example, an ether spacer group. Up to 10, preferably up to 5, e.g. up to 3, such as 1 heteroatom may be present. The backbone might also contain oxo groups along its length. Again whilst the Sp groups may all be different, it is preferred if these are the same.

When Y is a heteroatom it is obviously one which can have a valency of at least 3, e.g S, N, P.

Preferably, Y is a nitrogen atom or a phosphorous atom. The subscript n is preferably 3 when Y is nitrogen and 3, 4 or 5, especially 4, when Y is phosphorous.

It may also be possible to cross-link using metal chelates functionalised to carry two reactive groups on the chelating ligand. Thus, a suitably functionalised iron complex could be employed which could render the material magnetic.

Highly preferred cross-linking agents are biscarboxylic esters. Specific cross-linking agents of particular utility in the invention include sebacic acid esters (e.g. the N-succinimidyl ester whose structure is depicted below), disuccinimidyl suberate, bis(sulphosuccinimidyl) suberate, imidoesters such as dimethyl suberimidate, trissuccinimdyl aminotriacetate (TSAT, Pierce Biotechnology Inc.), beta-tris(hydroxylmethylphosphino) propionic acid (THPP, Pierce Biotechnology Inc.), bisphenol A diglycidyl ether, avidin-biotin. The known gelatin cross-linker gluteraldehyde is preferably not employed.

Scheme 1. Sebacic Acid bis (N-succinimidyl) ester (SANHSE)

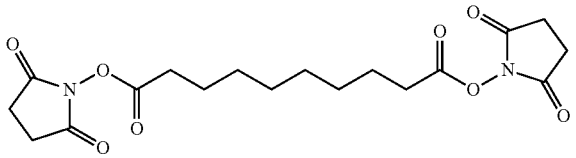

The SANHSE, in common with other bis-succinimidyl derivatives, is easily synthesised by condensing N-Hydroxysuccinimide with a dicarboxylic acid in the presence of dicyclohexylcarboiimide, the carboxylic acid being selected to provide a spacer of desired length. The resulting product contains two amine-reactive N-hydroxysuccinimide esters. This compound exhibits poor water solubility however. Hydrophilicity (and hence solubility) can therefore be increased by the addition of a sulfonate group into the succinimidyl ring. A number of water soluble bis-succinimidyl cross linkers are now commercially available from PIERCE (e.g. Bis(sulfosuccinimidyl) suberate (BS3) or disuccinimidyl suberate (DSS).

The water gels of the invention should preferably have a stiffness in the range of 20 to 100 kPa, preferably 30 to 60 kPa.

Another property of the water gel is its stress relaxation, with values in the range 0.05 to 0.3 kPa being preferred. Higher stress relaxation values indicate an increased ability to withstand impulse pressure.

The mixture of water and gel can comprise at least 3% by weight of the gel, preferably at least 4% by weight gel, especially at least 5% by weight gel, up to the limit of solubility of the gel in water, e.g. between 10% by weight and 50% by weight of gel, or in the range 15% by weight to 40% by weight gel, e.g. 20 to 35% wt.

The amount of water present may therefore be at least 40 wt %, e.g. at least 50 wt %, e.g. 60 to 90 wt %.

Mixing of the water and gel can be achieved by any convenient means, preferably with stirring or sonication to ensure complete mixing. Thus, the hot gel can be mixed with water in a mould and allowed to cool to form the water gel. The fact that the water gel sets means it can be moulded into essentially any shape. The water used may be deionised or distilled if desired but this is not essential. Other sources of water such as tap water are also employable. The cross-linking of the water gel can be carried out using any suitable protocol. Thus, the cross-linking agent could simply be added to an appropriate concentration of water gel mixture at a suitable pH to effect cross-linking. For example, cross-linking may be effected by the addition of an aqueous solution of a water soluble imidoester, such as dimethyl suberimidate.2HCl (DMS), to gelatin in aqueous solution, in PBS or other suitable buffer. An appropriate pH for the addition would be in the range 7.5 and 9.5 and temperatures of 20 to 40° C., e.g. 30-35° C. or 22-24° C. could be employed.

The concentration of cross-linker employed may be between 0.25 and 25 mM, e.g. 10 to 20 mM giving, in the case of gelatin, a molar ratio of amino groups to reagent of between 1:2 to 1:5.

Of particular utility however, is a process in which either a weak water gel solution or alternatively a soluble elastomeric monomer or mixture thereof e.g. resilin or elastin (or synthetic analogues of such monomers) is preincubated with a cross-linking agent preferably under carefully controlled conditions of pH and temperature. Thereafter, the preincubated material is contacted with a higher concentration water gel mixture to complete the cross-linking process.

Thus, the cross-linking agent, e.g. sebacic acid bis(N-succinimidyl) ester (SANHSE), can be added to a low concentration water gel mixture, e.g. 0.5 to 5 wt % of gel, preferably 1 to 5 wt %, more preferably 1.8 to 2.0 wt % or 2 to 4 wt % or added to a soluble elastomeric monomer or mixture thereof. Such an elastomeric monomer may be present in an aqueous solution which may preferably be of low concentration, e.g. 15 wt % of monomer, i.e. the concentration of monomer is less than the concentration of water gel used in the second stage.

It may be convenient to dissolve the cross-linking agent in an aqueous or organic solvent such as water, methanol, acetone, DMSO or toluene to allow addition. The nature of the solvent employed depends on the polarity of the cross-linking agent as will be readily understood by the skilled chemist. It may also be useful to buffer the water gel mixtures so that pH values can be maintained throughout the cross-linking procedure. PBS buffer is suitable for this.

The temperature and pH of both stages of the cross-linking reaction are preferably controlled to obtain the desired cross-linking characteristics in each stage of the reaction. The temperature during the preincubation stage is preferably less than that of the second stage. Thus, in preincubation, temperatures are preferably kept around ambient, e.g. 15 to 25° C., preferably 20 to 24° C., especially 22 to 24° C. The pH of the preincubation stage can be greater than that of the second stage (e.g. up to 1 or 2 pH points greater) however it should preferably be the same as or less than that of the second stage. Suitable pH's range from 6.5 to 7.5, e.g. 6.8 to 7.4, e.g. approximately 7.

After a preincubation period (e.g. of between 0.25 to 4 hours, especially 20 to 45 minutes), the preincubated material can be added to a water gel mixture of higher concentration, e.g. 20 to 50 wt % gel, preferably 20 to 40 wt % gel, especially 30 to 35% wt. The gel used may be the same as that employed in the first stage. What is important however, is that the gel employed in the second stage possesses a reactive group which is capable of completing the cross-linking reaction.

Thus, for example, where an N-hydroxysuccinimide ester is employed as the cross-linking agent, the second gel may preferably carry a reactive lysine functional group to complete the cross-linking reaction. It is preferred, however, if the gels employed in both stages are the same, e.g. both gelatin.

Preferred temperature ranges for this step are 38 to 48° C. and preferred pH's are 7.0 to 9, e.g. 7.5 to 8.7, preferably 8.0 to 8.5. For a SANHSE concentration of 0.5 mM to 5.0 mM, at pH 6.75-7.25 and at a temperature of 18 to 22° C., preincubation time is preferably 20 to 45 minutes.

The cross-linked water gel that forms can then be allowed to set for a suitable period at lower temperature, e.g. ambient temperature.

Thus, a process for the manufacture of a cross-linked water gel is provided comprising:

contacting a lower concentration water gel or a soluble elastomeric monomer with a cross-linking agent at a first pH and a first temperature to form a preincubated sample;

adding said preincubated sample to a higher concentration water gel at a second temperature and a second pH, said second temperature being higher than the first temperature. Preferably said second pH is the same as or higher than said first pH.

The amount of cross-linking agent required can vary over a wide range although the molar ratio of amino groups in the gelatin to reagent should be 1:10 to 10:1 e.g. approximately 1:1. A 5 mM solution of SANHSE in 50 ml gelatin equates to 1:1. Maximum concentration of cross-linking agent may vary depending on its solubility. Highly preferred concentrations of cross-linking agents such as SANHSE are in the range 1.25 mM to 2.5 mM. It has surprisingly been found that increasing concentrations higher than this range does not necessarily impact favourably on final gel strength and may in fact reduce gel strength.

Whilst the preincubation process gives excellent results with reagents that are soluble in aqueous solution, it will be appreciated that many cross linking agents, including for example N-hydroxysuccinimide esters such as SANHSE, have a very low solubility in aqueous solution, a problem that is exacerbated in the presence of high concentrations of a hydrogel in the aqueous phase e.g. 30% w/w gelatin. This presents a very significant hurdle to using such reagents to crosslink the hydrogel due to rapid precipitation of the reagent. This in turn leads to great difficulty in achieving an even distribution of active reagent through the solution.

The use of a preincubation stage that has the effect of binding the crosslinking reagent to the hydrogel itself, e.g. gelatin molecules (preferably at a low initial concentration e.g. 1.8-2.0% w/w) or to a soluble elastomeric monomer allows the previously insoluble reagent to be carried into the second stage in a fully soluble but still active form. The use of the preincubation phase to overcome the inherently low solubility of many crosslinking agents, such as SANHSE, in the aqueous phase represents a still yet further aspect of the invention. Suitable elastomeric monomers include resilin and elastin or synthetic analogues thereof.

Another cross-linking method involves avidin and biotin. Avidin and biotin form the strongest naturally occurring non-covalent bond. It is entirely specific and with a kD of 10-15 (Green, A. J., (1966) Biochem J. 100:774-780). Cross-linking a water gel using these species is therefore attractive. Two forms of pre-reacted gelatin would be required: form (A)—modified with avidin and form (B) modified with biotin. When a reconstituted gel was required the A and B forms of the pre-reacted gelatin would be prepared as usual in aqueous solution. Once the A and B forms have been completely solubilised they are then mixed in equal proportions and the gel allowed to set. The A and B forms of the gelatin will automatically associate with each other through the interaction of the avidin and biotin. This avidin biotin driven aggregation of the gelatin monomers will result in the creation of a strong semi-covalent bonding network through the gelatin as it sets.

Biotinylation of gels is effectively and simply carried out using N-hydroxy succinimide esters of biotin, which is the same functional group as found in SANHSE. The form of NHS ester used could either be Biotin N-Hydroxysuccinimide or Biotinamidohexanoic acid N-Hydroxysuccinimide Ester. The latter having an amino caproate spacer arm which holds the biotin at a greater distance from the protein to which it is bound. It might also be possible to biotinylate the gelatin using a combination of these reagents to maximise the potential semi-covalent network formed within the gel state.

As with SANHSE the Biotin NHS esters readily react with the s-amino groups of lysine and the N-terminal α-amino group (where this is not blocked) at pH 8.0-9.0.

Avidin is a glycoprotein extracted from eggs that can readily be attached to proteins.

It is envisaged that the mixing of the two gelatin components here could take place in the field allowing easy transport of water gel in powder form. Once the A and B form of the gelatin have been prepared they can be lyophilised and the powder stored prior to re-hydration and use.

The pressure impulse mitigating barrier of the invention may be formed from a water gel sheet carrying an array of protrusions, e.g. hemispherical protrusions, formed from the water gel. The barrier may therefore have a structure akin to bubble wrap where a plurality of hemispherical air filled protrusions are present on a sheet of plastic. In the present invention however, the protrusions are formed from the water gel and are therefore solid. By solid therefore is meant that the protrusions are not gas or liquid filled, rather they are formed from the water gel.

The protrusions need not be hemispherical (although this is preferred), any suitable shape is employable, e.g. rectangular, hexagonal or triangular protrusions or mixtures of differently shaped protrusions. The person skilled in the art will appreciate that a protrusion need not be a perfect hemisphere, square etc. Hemispheres may be more hemi-ovoid in shape, be carapace shaped or may become flattened slightly so as to form a more cylindrical or conical shapes. These will all fall within the scope of the term hemisphere however.

The protrusions can be present on both sides of the water gel sheet but are preferably present on one side of the water gel sheet only. This allows a flat side to present which can be adhered to a substrate. It is possible therefore to adhere two single sided pressure mitigating barriers to either side of a supporting substrate, e.g. a fibreglass layer or ceramic tile, to form a barrier in which protrusions are present on both sides of a supporting substrate.

The protrusions are preferably arranged in a regular array, i.e. the pattern of the protrusions repeats in some fashion. Typically therefore the pattern may involve straight lines of protrusions or preferably a hexagonal array. Ideally therefore, the barrier comprises a regular two-dimensional array of protrusions. In particular, where the protrusions are hemispherical, they pack in a hexagonal geometry.

The dimensions of the protrusions can vary over broad limits but they may be of the order of 0.1 cm to 50 cm, e.g. 0.5 to 10 cm, preferably 0.75 to 5 cm, about 1 cm at their broadest diameter (e.g. diagonally for a square or rectangular protrusions). The protrusions might be 0.1 to 25 cm in maximum height, e.g. 0.5 to 10 cm. It will be possible to use a mixture of differently sized protrusions, different patterns and/or differently shaped protrusions although it will be appreciated that making all the protrusions identical in the same pattern makes manufacture easier and is therefore preferred.

The water gel sheet on which the protrusions form can be made as thick or thin as desired. The sheet may however be 0.1 to 50 cm, e.g. 1 to 10 cm in thickness. It will also be possible to vary the thickness of the sheet along its length so that thicker areas are present in areas where particular protection is needed. The nature of the protrusions could also be graduated, e.g. with large protrusions in certain areas and smaller protrusions elsewhere or perhaps areas of protrusions and areas of simple planar water gel sheet.

The water gel sheet is preferably planar but can be made curved if necessary. It may prove advantageous for example, to use a concave or convex barrier or one which is waved. Such curved barriers may be essential when fitting the barrier on curved surfaces.

The water gel mixture can be formed into the shaped barriers which mitigate the effects of explosion or the effects of contact with a projectile using moulds. A hot water gel mixture need simply be poured into a mould comprising the necessary indentations to form the protrusions in the gel.

There is a close relationship between the concentration of gel within a barrier, the thickness of the barrier and its performance, e.g. as a pressure impulse mitigant. The skilled person will be able to tailor concentrations and thicknesses to prepare barriers having desired properties.

By shaping the water gel in this fashion, the resulting sheets of water gel are easier to cut into an appropriate shape and are stronger in that they do not tear easily. The presence of the protrusions prevents propagation of a tear, in particular where the protrusions are arranged in a hexagonal array.

It is also an advantageous feature of the invention that this shaped water gel pressure impulse mitigation barrier can be transparent.

In a further aspect of the invention, the water gel layer is combined with at least one layer comprising a plurality of disruptor particles. By disruptor particles is meant irregular or preferably regular shaped particles, e.g. spheres of material, which can be used in conjunction with the water gel layer to form an even stronger barrier. The disruptor particle layer is preferably embedded within a water gel layer or may at least be in contact with a water gel layer.

It has been surprisingly found that a water gel layer in combination with a disruptor particle layer gives rise to still further improvements in pressure impulse mitigation. The disruptor particles may be formed from a wide variety of materials such as fibreglass, graphite, stone (sandstone, quartz, basalt, flint, pumice), metals (steel), glass (e.g. hollow spheres of glass) but are preferably ceramic particles.

By ceramic is meant inorganic non-metallic material such as alumina, beryllia, steatite or sterite, whose final characteristics are produced by subjection to high temperatures, e.g. in a kiln. Often the ceramic material derives from clay.

Ceramic particles of use in the invention may be manufactured as is known in the art although preferably these are formed from aluminium oxide or silicon nitride. Aluminium oxide ceramic particles may be at least 98%, e.g. at least 99% alumina and may have a Vickers hardness of at least 1300, e.g. at least 1700 Hv. They may also have a modulus of elasticity of 300 to 400 kNmm$^{-2}$, e.g. 350 kNmm$^{-2}$, a fracture toughness of 10 to 20 MPam$^{-2}$, e.g. 13.5 MPam$^{-2}$ and an ultimate compressive strength of 1 to 5 kNmm$^{-2}$, e.g. 2.5 kNmm$^{-2}$.

Silicon nitride ceramic balls ($Si_3N_4$), may comprise between 80 and 90%, e.g. 87% silicon nitride and may have a Vickers hardness of at least 1300, e.g. at least 1400 Hv, such as 1400 to 1700 Hv. They may also have a modulus of elasticity of 250 to 400 kNmm$^{-2}$, e.g. 310 kNmm$^{-2}$, a fracture toughness of 4 to 10 MPam$^{-2}$, e.g. 6 to 8 MPam$^{-2}$ and an ultimate compressive strength of 2 to 7 kNmm$^{-2}$, e.g. 4 kNmm$^{-2}$.

Both aluminium oxide and silicon nitride are inert, non-toxic and essentially unaffected by heat (they will function at temperatures of greater than 1000° C.) making them ideal for use in the barriers of the invention. Ceramics also weigh considerably less than steel, typically 50% less. Thus for example, aluminium oxide ceramics have a density of approximately 3.8 to 3.9 g/cm$^3$, and silicon nitride ceramics a density of around 3.2 to 3.25 g/cm$^3$. In contrast steel has a density of the order of 7.8 g/cm$^3$. The use of ceramic disruptor particles as opposed to steel particles is therefore of significant benefit in terms of barrier weight. Thus, a barrier with the same performance as steel can be prepared using the water gels of the invention at much lower weight.

Moreover, the Vickers hardness index of steel is around 700 to 800 Hv and is therefore approximately 50% less than that of the ceramics discussed above.

The size of the disruptor particles may vary over a broad range. Preferred diameters range from 1 mm to 50 mm, preferably 1 to 25 mm, e.g. 5 to 15 mm, especially 10 mm. It may also be possible to use particularly small disruptor particles of the order of 10 to 1000 microns in diameter. Such miniature particles are generally hollow ceramic spheres (e.g. formed of sodium borosilicate).

Preferably the disruptor particles are regularly shaped so that they pack using a minimum amount of space. Suitable shapes therefore include cubes and cuboids, a honeycomb type structure or spherical structures, e.g. ovoid or spheres. The particles are preferably spherical.

Since the disruptor particle layer may be embedded in the water gel layer, where spheres are employed as disruptor particles, due to the way spheres pack, this may lead to a barrier surface comprising a plurality of hemispherical protrusions as hereinbefore described.

In a particularly preferred embodiment therefore the invention provides a pressure impulse mitigating barrier comprising a plurality of ceramic balls embedded in a water gel layer wherein the surface of the barrier comprises a regular two-dimensional array of protrusions formed from said water gel.

A number of disruptor particle layers can be present to maximise pressure impulse mitigation. It is preferable, for example, if 3 to 10 layers are utilised, e.g. 3 to 5 layers. Again, where spheres are used as the disruptor particles, these will pack to form a hexagonal layered structure as is well known.

The use of disruptor particles in the barrier of the invention has many advantages. Firstly, when the barrier absorbs an impact, the disruptor particles crush to a powder rather than splinter. Conventional armour materials are known to splinter under high impact. Whilst the bullet may therefore be stopped, damage to personnel can still occur through splintering of the pressure mitigating material. The use of ceramic balls minimises this hazard since no splintering occurs.

Moreover, the powdered ceramic disruptor particle is held within the water gel matrix.

Also, by using a plurality of small disruptor particles as opposed to a continuous layer of material, e.g. a ceramic tile, the barrier remains stronger after initial impact. When using a solid continuous layer in conjunction with a water gel, e.g. a ceramic tile as opposed to ceramic spheres, a larger portion of the barrier may be weakened after a first impact. The pressure impulse of the first impact is believed to be transmitted throughout a portion (e.g. a circle of diameter radius 10 cm) of the continuous barrier weakening therefore a large portion of it. This effect is also observed when a plurality of tiles are used. Thus, a fracture caused by an impact can be transferred from tile to tile extending the area of damage in the barrier and hence weakness significantly beyond the initial impact point.

For disruptor particle based layers, the damage is very localised meaning that the rest of the barrier remains integral and capable of absorbing further impacts.

Moreover, the water gel-disruptor particle system is inherently flexible. The use of a hard continuous barrier to improve pressure impulse mitigation would result in a non-flexible barrier of more limited application than a flexible material as proposed herein.

The use of disruptor particles in combination with a water gel may also allow miniaturisation of the barrier for applications to protect small but vital components of aircraft, rockets, missiles etc. Thus, ceramic balls of 1 to 5 mm, e.g. 2 to 5 mm, in diameter could be used as disruptor particles preferably along with a cross-linked water gel to form a light pressure impulse mitigating barrier.

The layer or layers of disruptor particles are preferably towards the surface of the barrier which receives the first impact.

The overall thickness of the pressure mitigating barrier may vary depending on the nature of the barrier, e.g. whether it is being used to protect windows, personnel, buildings etc. However, suitable thicknesses are in the range 0.1 cm to 1 m, e.g. 1 to 50 cm such as 1 cm to 20 cm, preferably 2 cm to 10 cm.

Suitable thicknesses for barriers to be used in building cladding are in the range of 10 to 100 mm preferably 10 to 20 mm. Where the material is used to cover windows suitable thickness is in the range of 10 to 50 mm. When the material is used in clothing suitable thickness is in the range of 10 to 70 mm.

When used to protect against high velocity bullets, thicknesses may be of the order of 5 to 30 cm.

In order to protect the barrier material against degradation by, for example, bacteria or light it may be essential to mix the water gels with antibacterials (e.g. sodium azide) or proteinase inhibitors such as EDTA (e.g. at 5 mM concentration), detergents and/or antioxidants as additives in the water gel formulations. Other additives include colouring agents to produce a tinted product, emulsifiers, viscosity modifiers, organic additives (such as xanthum gum, starch), inorganic additives (such as sodium sulphate, calcium salts, magnesium sulphate, ammonium sulphate) can be employed.

Metabisulphite and parachlorometaxylene are advantageous preservatives.

Thus, the water gel layer in the barrier of the invention should preferably comprise at least 50% by weight of water gel component, more preferably at least 80% by weight, especially at least 95% by weight of water gel, e.g. 98% wt. Ideally, the water gel layer should consist essentially of water and gel (i.e. incorporates only minor quantities of impurities or standard additives).

The barrier of the invention may also comprise multiple layers in addition to any disruptor layer. Layers of water gel can therefore be mixed with other layers of optionally cross-linked optionally shaped water gel with differing concentrations of gel and/or with other pressure mitigating materials to form composites. In one embodiment therefore, the method of the invention may involve a barrier comprising a number of layers of cross-linked water gel. Moreover, in such a design, the outside cross-linked water gel layer may have the highest concentration of gel with decreasing lower concentrations of gel on the inside of the barrier.

Any barrier of this invention may additionally comprise other non water gel layers, for example, a polymer layer (e.g. a polyethylene (LDPE, LLDPE, HDPE), polypropylene or polycarbonate layer), a metal layer (aluminium or steel), a fabric layer (cotton), a fibreglass layer, a dilatant layer (e.g. polyethylene glycol layer), a ceramic layer or a silicone layer, a graphite layer, graphite/epoxy composite layer, glass/epoxy composite layer, cyanate ester layer resin composite (e.g. aromatic cyanate ester) or mixtures of such layers. A fibreglass layer and/or a ceramic layer is especially useful. Moreover, it is within the scope of the invention to overlap layers to maximise strength. For example, a barrier comprising a ceramic layer might be less strong where separate ceramic tiles are joined to form the layer. By overlapping layers of ceramic material (like when using building bricks and mortar) these weaknesses can be eliminated.

A dilatant is a material which thickens upon applied shear stress, e.g. may turn solid upon applied shear stress and examples thereof are polyethylene glycols and silicones.

Where a multilayer structure is employed it is preferred if the layers are in contact with each other, i.e. there are no gaps between the layers.

The thickness of additional layers can of course vary depending on the nature of the material involved. Suitable thicknesses range from 0.1 to 20 cm.

Layers of fire retardant material, layers of material impervious to chemicals, radioactivity or biological agents could also be added to the barriers of the invention.

Thus, the number of layers employed in the barrier of the invention can be high. Moreover, non gel layers can be set in gel to improve the homogeneity of the barrier. Thus, fibreglass layers may be set in water gel.

All layers of the pressure impulse mitigating barrier can be encapsulated in a suitable container if required, e.g. a polymer container such as a polypropylene container, for ease of transport and storage, although this is not essential.

In fact a further advantage of the invention is that the material itself can be transported in non-aqueous form, e.g. powder form, and made up to the water gel when required, e.g. using an avidin biotin cross-linker as described above. A potential difficulty with the water gels may be their weight but the fact that the material can be transported as a powder and made into the water gel only when required is a major advantage.

The barriers could have important applications in the military and for the general public close to industrial sites such as chemical storage facilities, nuclear reactors or research laboratories or areas where transportation of hazardous materials occurs. The barriers could be used in clothing to protect against, fire, explosion, projectile damage and the threat of chemical, biological or radiological contamination. The material may also act as a suppressant to chemical contamination by interacting with any aqueous soluble chemical to reduce the toxicity of the chemical.

The material of the invention may also provide therefore a barrier to chemical or biological contamination, e.g. as the result of a criminal attack or chemical leak. The surface of the water gel material is inherently sticky and hence biological and chemical compounds may attach to the surface of the material thereby preventing further contamination taking place. Water soluble agents may dissolve in the water gel barrier. Organic agents are insoluble in the water gel and will therefore be repelled.

Additionally the water gel material acts as a barrier that, unlike most open weave material, prevents biological materials under the size of 5 microns from passing through to the surface of a material below.

If a water gel layer was combined with, for example, a boron layer a broader range of radiological effects could be preventable. Thus, gamma radiation or neutrons could be absorbed by a water gel barrier comprising a boron layer. The water gel materials of the invention are therefore able to absorb the initial blast of a nuclear explosion and also absorb associated radiation and protect against associated heat.

Water gel barriers also provide the added advantage that post contamination clean up is made much simpler. Since the chemical or biological agent may stick to or dissolve within the water gel, clean up can be effected simply by removing the water gel sheet from the structure in question.

The barrier may also be waterproof. The barrier can be formed into any suitable shape depending on the nature of the protective barrier desired. The width of the material will depend on the nature of the use. Thus, where the barrier is being used to prevent fragmentation of glass in a window, the barrier can be formed into a sheet for use in covering the window.

When used as a protective layer over building cladding, it is important that the lower part of the building is protected from the effects of a blast. Thus, the protective water gel barrier may be adhered only to the lower part of a building, e.g. the bottom seven floors since this is the area which suffers from the greatest blast impact from a ground based explosion. Some buildings might require complete protection, e.g. nuclear power stations, where protection from missiles and the like might be important.

The protective water gel barrier may be continued inside the building on partitions or inside walls to strengthen the structural resistance to blast. The material may also be used as a protective surface across the whole facade of a building to protect against explosive pressures from very large explosions or from air-borne contaminants from an explosion.

Barriers may also be formulated as protective blankets, or clothing for personnel or as tent coverings or coverings for temporary buildings. Thus, the barrier could be in a form to protect the eyes, ears or feet, e.g. as shoes. Alternatively, very large sheets could be produced for covering critical environmental areas, e.g. reservoirs, or iconic targets. Temporary structures, in particular temporary military structures, may be covered with this material to mitigate the impact of explosions on buildings equipment and personnel.

For convenience, the material for permanent or temporary fixing across doors, windows, on horizontal or vertical surfaces etc may be in rolls that can be cut to create barriers.

The barriers of the invention can also act to disrupt the flight of projectiles, i.e. can act as armour by protecting against bullets etc.

It is envisaged that the barrier of the invention may mitigate pressure through the shock absorbing characteristics of the gel. Moreover, the gel fibres are envisaged to change the trajectory of a projectile and create drag on the projectile.

The gel may therefore resist the pressure wave of a projectile by absorption thereof. The gel is able to expand during shockwave impact and "bounce back" the pressure wave onto the oncoming projectile or shock wave. This action reduces or eliminates the pressure wave created by the projectile and reduces or eliminates the kinetic shock of the projectile.

The gel also reduces the inherent energy of the projectile through slowing the speed of passage of the projectile through the gel and this reduces the projectile pressure wave on the entity being protected by the gel. The gel also focuses the pressure wave of the projectile back along the trajectory of the projectile thereby creating a pressure effect outside the gel layers. Moreover, it is believed that ceramic balls may remove the shell of armour piercing rounds. The presence of the disruptor particles is believed to destabilise the round, stripping off the outer shell of an armour piercing bullet. The water gel material is then able to absorb the inner shell.

Projectiles may be in the form of bullets, rockets or missiles or other projectiles travelling at speeds that may be in excess of 3,500 metres/second.

Thus, the barriers of the invention have a range of applications from bullet proof vests and helmets to replacement for sandbags to protect army personnel from enemy fire.

The barriers of the invention may also have utility in the protection of ships from blast or projectiles. Both commercial and military ships have been the recent targets of terrorists and military ships in particular face dangers with mines and missiles. The barriers of the invention may be used to coat either the inside and/or outside of the ship's hull to thereby act as a pressure mitigant. Where a ship has a double hull, the barrier may be used to coat both hulls or used in the cavity between hulls.

The barrier employed may be as thin as 2.5 cm and may be applied to the hull using a conventional adhesive. Thicker layers can be applied to parts of the ship where extra protection may be required, e.g. to protect parts of the hull where damage could cause the hull to split or to protect parts of the hull housing weaponry etc.

It is also envisaged that ships could be fitted with permanent or preferably temporary skirts to prevent any damage occurring to the hull at all. The skirts would take the form of vertically suspended barriers made as thin as possible to minimise weight. Such skirts may be suspended from the side of the ship, e.g. using wires, and may prevent attacks on a ship's hull from surface to surface missiles, torpedoes, mines, or terrorists in boats. In view of their weight, these skirts could be employed only on areas of the hull where explosive damage could be critical, e.g. at the centre point of the hull where explosive damage may cause the hull to split.

Also, the skirts could be employed temporarily as a ship passes through potentially dangerous waters, the skirts being removed once the ship returns to safer areas. Thus, skirts could be employed when a ship was in port, near the coastline or in a narrow channel etc but removed in open waters. The skirts create a buffer between the hull and the skirt to mitigate any explosive effects on the hull. Moreover, in view of their make up, the skirts are not visible from afar and are difficult to detect by radar.

The barriers could also be used to protect other marine installations such as oil rigs, underwater cables, pipelines, underwater monitoring equipment and could even be used to protect submarine hulls.

The material may also have applications deep underground where tunnels could be lined with the barriers to mitigate the effects of explosions underground. Drilling equipment etc could also be protected.

In this regard, the application of this material in the protection of pipelines (whether under water, under ground or over ground) is of particular interest. Pipes could be wrapped in the water gel material to provide a cheap form of pipe protection. Where pipes need to be protected from blast or rocket propelled grenades or the like (e.g. to prevent sabotage of an oil pipeline), the water gels of the invention could be formed into cages with wire (e.g. chicken wire) and placed around a pipe. The mitigating effects of the wire, the water gel and the air space between the cage and the pipe (which may of course also be coated in water gel) act synergistically to provide excellent pipeline protection from attack.

The barriers can also be moulded to form a protective shell on a vehicle. Military vehicles which carry personnel or equipment are conventionally covered with very thick and hence heavy metal plates to stop incoming small arms fire, rocket propelled grenade rounds, damage from mines and shells. When the water gels of the invention are moulded, e.g. with a fibreglass, graphite, graphite/epoxy composites, cyanate ester (including aromatic cyanate ester) resin composites or polyurethane shell it may be possible to manufacture a light, fast vehicle capable of withstanding damage from these threats. 30 cm of barrier material covering a lightweight body that could stop incoming attacks.

The vehicle body could be shaped to minimise the chance of the vehicle being detected by radar. Thus, the external appearance of the vehicle may be similar to the inverted hull of a boat. The water gels of the invention are inherently hard to see with radar and the combination of the water gel and the special vehicle shape may make the vehicles very difficult to detect.

The material could also be used as a fuselage or wing liner in aircraft. In particular, the hold of an aircraft could be lined with the material to mitigate the effects of an explosion within the hold. Furthermore, cargo containers themselves could be lined with the material, internally or externally.

A still further potential application of the barriers is in space where they could be used to cover space vehicles to protect them from space debris. If a satellite, rocket, space station etc comes into contact with an article of space debris, considerable damage can be done in view of the incredibly high speed of impact. A recent space shuttle accident was caused by damage caused by small parts detaching from the upper portions of the rocket and contacting the lower portion of the shuttle vehicle. Such damage could be minimised if the barriers of the invention where employed as coatings. Moreover, ceramics are well known to resist heat and are therefore an ideal component of a impulse mitigation barrier in a space vehicle.

It is also envisaged that the water gel barriers of the invention could be deployed as a net from, for example, a satellite, to provide protection against a ballistic missile. The net could be deployed to intercept and destroy, capture or deflect such a missile.

It is also envisaged that the barriers of the invention may protect against heat, flame and fire. By definition, the water gels of the invention comprise an aqueous component. For this reason, they are capable of absorbing heat and dousing flame much more efficiently than other pressure impulse mitigation materials. Ceramics are also well known to possess a massive heat resistance. It is a particular advantage of the invention that the pressure impulse mitigating barrier simultaneously can act to protect against fire.

The water gels of the invention are more effective at mitigating the effects of fire at lower gel concentrations, i.e. higher water concentrations. However, the water gels are more effective at pressure impulse mitigation at higher gel concentrations. It is therefore within the scope of the invention to provide a multilayer barrier comprising water gel layers having varying gel concentrations to provide barriers tailored to mitigate the effects of both fire and pressure. Higher concentration layers can comprise a plurality of disruptor particles as described previously.

Fixing the barrier to a structure can be achieved using conventional techniques. For example, for window protection, the material may be adhered to the window surface (inside and/or outside) using known adhesives such as ceramic bonds or other bonding materials that adhere to wood, concrete or glass surfaces. These materials are readily available through suppliers to dentists for bonding of ceramic veneers to teeth, and in the construction industry for bonding materials together.

It is particularly advantageous if the bond between the barrier and the window is stronger than the fixing holding the window frame into the wall. The fact that the water gel barriers are flexible ensures that they are suitable for use with many modern buildings where walls and glass are curved or unconventionally shaped.

The material could be placed in wall cavities or roof space or secured to the outside of a building by adhesives or in a frame. The person skilled in the art can devise alternative methods of fixation.

Other forms of encapsulation of layers of the water gel material may involve vacuum sealing and the use of hydrostatic films as is known in the art. The gels may be acidic or basic giving rise to further options for fixation.

Thus, the barriers of the invention can simultaneously act against the possible detrimental effects of explosions, projectiles, fire, chemical, radiological or biological leakage.

The invention will now be further described with reference to the following non-limiting examples and FIGS. 1 to 4.

EXAMPLE 1

Figure 1:
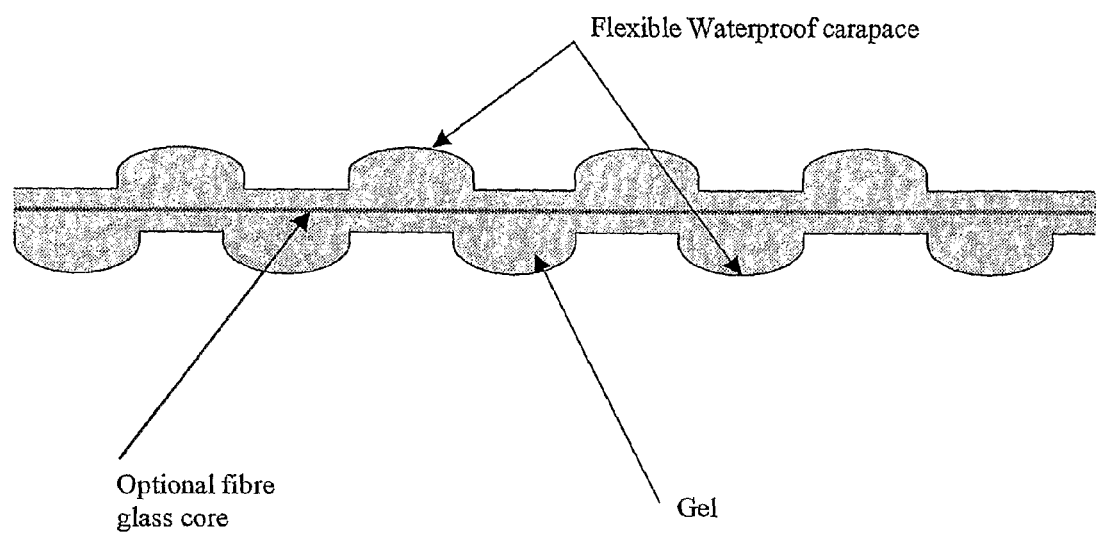
FIG. 1 is a representation of a shaped pressure impulse mitigating barrier in which two planar barriers carrying a plurality of hemispherical protrusions are supported on a fibreglass layer.

A 35 wt % water gel was made up by mixing an appropriate amount of gelatine obtained from commercial suppliers and tap water. The water gel was formed into a barrier by pouring a hot solution of the gel into a mould and allowing this to cool.

EXAMPLE 2

Preincubation

Solution B
(1) Weigh 1.622 kg of hot water of at least 60° C. into a 2 liter container.
(2) Sprinkle gelatin (72 g) to the warm water, whilst stirring.
(3) When the gelatin has dissolved, add 32 ml of 10% sodium hydroxide with gentle stirring.
(4) Check the pH with a temperature compensated pH meter.
(5) If necessary, adjust to 6.7-6.8 at 40° C. with 1 ml aliquots 10% NaOH (or 2M HCl).
(6) Cool to 30-35° C. with gentle stirring. If a gel forms, warm the mixture to melt it.
(7) Add 30 ml of a 10% suspension of Disuccinimidyl suberate (DSS) in methanol to the mixture with vigorous stirring. Wash the DSS container out with another 30 ml of methanol and add it to the mixture.
(8) Stir the mixture vigorously for 5 minutes and allow to stand for another 25 minutes (i.e. total of 30 minutes from DSS addition) before use.

Solution A
(1) Weigh 10.6 kg of water into a 25 kg kettle.
(2) Heat to 90-95° C. with steam.
(3) Weigh 5.0 kg of gelatin.
(4) Add gelatin to the hot water, whilst stirring with a paddle, and heating vigorously ensuring that:
a. The temperature does not fall below 75° C.
b. The gelatin does not form light lumps.
c. Air is not trapped in the mixture.
d. Mixture is moved away from the hot surfaces towards the centre of the kettle.
(5) Add 380 g of 10% NaOH with stirring and heating.
(6) Weigh 2.28 kg of gelatin.
(7) Add gelatin slowly to a heated and stirred mixture ensuring that:
a. The temperature does not fall below 75° C.
b. The gelatin does not form light lumps.
c. Air is not trapped in the mixture.
d. Mixture is moved away from the hot surfaces towards the centre of the kettle.
(8) Weigh 160 g of 10% NaOH and add it to the mixture with stirring and heating.
(9) Stir gently, put a lid on the kettle and allow to stand for 5 minutes.
(10) Measure the pH with a temperature compensated pH meter.

(11) If necessary, adjust the pH to 8.0-8.2 at 55-60° C. using 10 ml aliquots of 10% NaOH.
(12) Close the kettle and allow the mixture to stand for 5-10 minutes whilst monitoring the pH with a pH meter.
(13) Before use, skim the light coloured desiccated, foamy and gelatinous materials from the surface of the mixture.

Preparation of 36.8% Water Gel
(1) Add Solution A to a well stirred Solution B whilst keeping the temperature above 60° C.
(2) If required, 60 g of a 10% preservative solution may be added at this point.
(3) Use immediately. If not, do not allow the temperature to fall below 60° C.

| 36.8 wt % water gel Batch size (kg) Component | % | % Total | 20 Weight (kg) |
|---|---|---|---|
| Solution A - 40% gelatin | 91% | | |
| Gelita Gelatin Bloom 302 | | 25 | 5.000 |
| Water | | 52 | 10.400 |
| 10% Sodium Hydroxide | | 1.9 | 0.380 |
| Gelita Gelatin Bloom 302 | | 11.4 | 2.280 |
| 10% Sodium Hydroxide | | 0.8 | 0.160 |
| Solution B - 4% DSS gelatin | 9% | | 0.000 |
| Gelita Gelatin Bloom 302 | | 0.36 | 0.072 |
| Water | | 8.11 | 1.622 |
| 10% Sodium Hydroxide | | 0.159 | 0.032 |
| 10% DSS in Methanol | | 0.15 | 0.030 |
| Methanol | | 0.15 | 0.030 |
| | | | 0.000 |
| Totals | 100% | 100 | 20 |

EXAMPLE 3

The following samples (all 300×300× approx 100 mm) were prepared:

| Sample | Layer | Thickness mm |
|---|---|---|
| Samples 1 to 3 | Polyethylene sheet | 3 |
| | English ceramic tile set in Ex 1 material | 8 |
| | Fibreglass set in Ex 1 material | 50 |
| | Ex 2 | 30 |
| | Fibreglass set in Ex 1 | 12 |
| | Polyethylene sheet | 3 |
| Sample 4 | Polyethylene sheet | 3 |
| | 5.5 Ceramic ball layers set in Ex 2* | 50 |
| | Fibreglass set in Ex 1 | 36 |
| | Ex 2 | 8 |
| | Fibreglass set in Ex 1 | 12 |
| | Polyethylene sheet | 3 |
| Sample 5 | Polyethylene sheet | 3 |
| | 4 Ceramic ball layers set in Ex 2* | 38 |
| | Fibreglass set in Ex 1 | 24 |
| | English tiles | 8 |
| | Fibreglass set in Ex 1 composite | 24 |
| | Polyethylene sheet | 3 |
| Sample 6 | Polyethylene sheet | 3 |
| | English tile | 8 |
| | Fibreglass set in Ex 1 | 7 |
| | Ex 2 | 24 |
| | English tile | 8 |
| | Fibreglass set in Ex 1 | 7 |
| | Ex 2 | 24 |
| | English tile | 8 |
| | Fibreglass set in Ex 1 | 7 |
| | Polyethylene sheet | 3 |

*The ceramic balls form approximately 60 to 70% by volume of the layer and are alumina balls of 10 mm in diameter.

Into Samples 1 to 3 were fired 5 shots:
Shots 1 & 2. A .3 calibre armour piercing bullet
Shot 3. A .223 calibre bullet.
Shot 4. A .3 calibre standard bullet.
Shot 5. A .3 calibre armour piercing bullet fired at the intersection of tiles
Into samples 4 and 6 were fired six shots.
Shots 1 & 2. A .3 calibre armour piercing bullet
Shot 3. A .223 calibre bullet.
Shot 4. A .3 calibre standard bullet.
Shot 5. A .3 calibre armour piercing bullet
Shot 6. A .3 calibre armour piercing bullet in the same place as shot 5.
Into sample 5 were fired seven shots.
Shots 1 & 2. A .3 calibre armour piercing bullet
Shot 3. A .223 calibre bullet.
Shot 4. A .3 calibre standard bullet.
Shot 5. A .3 calibre armour piercing bullet
Shot 6. A .3 calibre armour piercing bullet in the same place as shot 5.
Shot 7. A .3 calibre armour piercing bullet in the same place as shot 5.

Results of Tests

Figure 2:
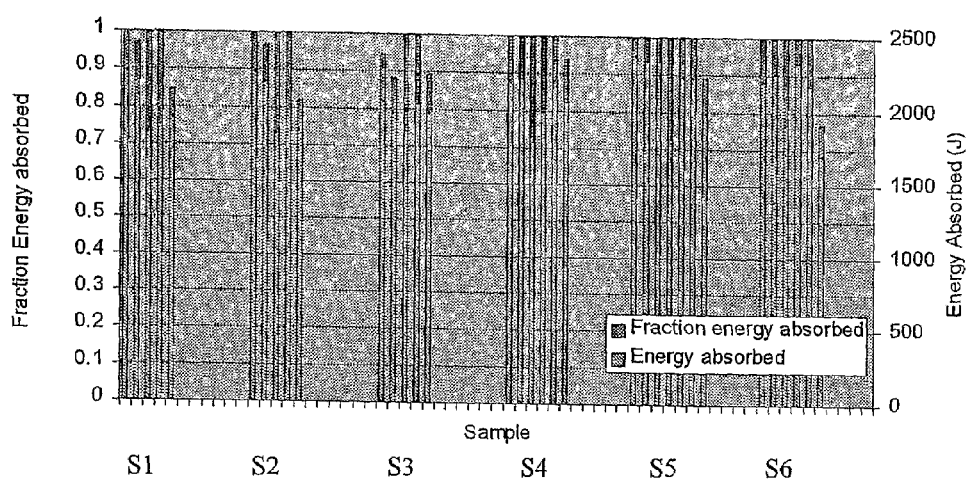
FIG. 2 shows the ballistics results from Example 3.
Figure 3:
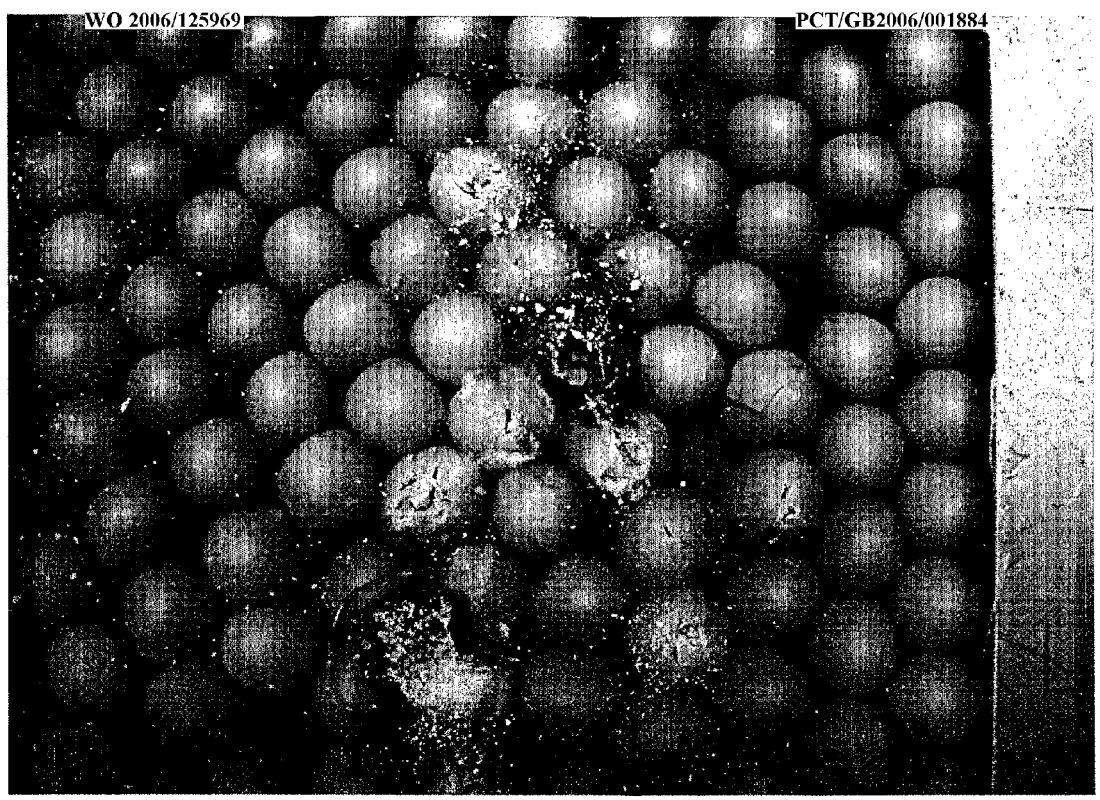
FIG. 3 is a photograph of a ceramic ball layer after an impact.
Figure 4:
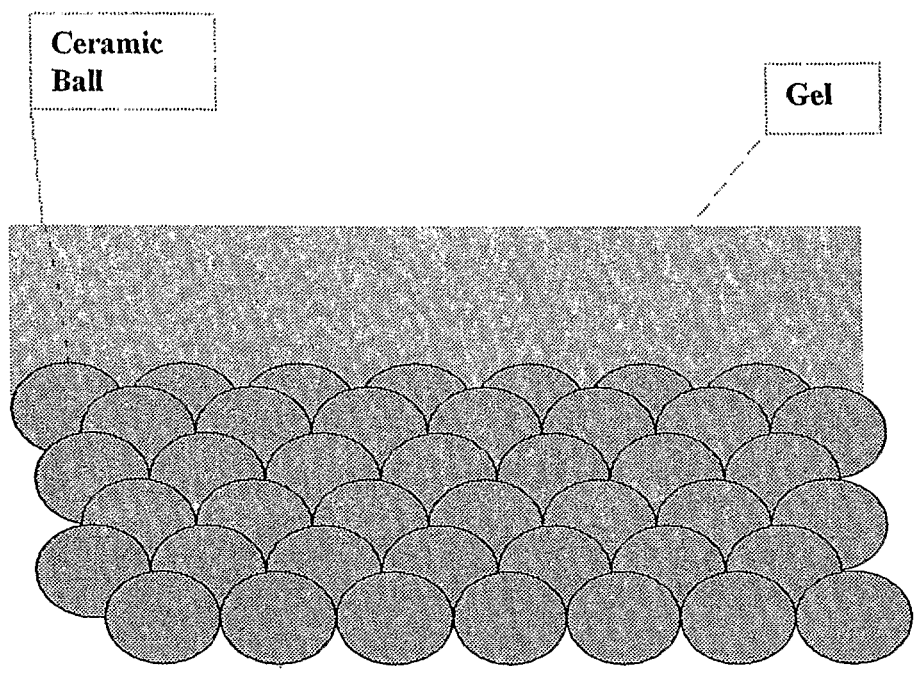
FIG. 4 is a representation of a water gel layer and ceramic balls layer.

FIG. 2 shows the results of ballistic tests. The first three samples are of similar construction. The results represent statistical variations due to slight variations during manufacture in the construction of the samples. The first two shots in each represent the effect of a .3 calibre armour piercing projectile on the samples. While the first shot was stopped, the subsequent shot did fully penetrate the target. Sample 3 performed slightly worse than the other two samples. The third shots in each samples were from a .223 calibre projectile. All were stopped by the target. Similarly the fourth shots that were all stopped were from a .3 calibre standard projectile. The fifth shots were .3 calibre armour piercing rounds shot into the point of intersection of the tiles, which should correspond to its weakest point. As expected all passed through but a significant amount of energy was still absorbed All three types of projectiles were stopped by sample 4. The fifth and six shots were a .3 calibre armour piercing rounds in which the sixth shot was virtually on top of the fifth (less than 1 cm away). The sixth shot penetrated the target indicating the degree of powdering of ceramic from the previous shot did not leave enough resistance in the target.

Similarly all three types of projectile were stopped by sample 5. The sixth and seventh shots were within 1 cm of shot 5. Shot six was caught by the sample being wedged in the polyethylene while shot seven penetrated the sample.

Sample 6 was alternative layers of tile with a fibreglass backing and Ex 3 water gel. The sample again stopped all types of projectile. The sixth shot was aimed at the intersection of tiles, which was at the weakest point, and on top of the fifth shot. The shot fully penetrated the sample.

EXAMPLE 4

Shaped Water Gels

Into a frame were placed approximately 2 foot square sheets of ordinary window glass. Weights (2-4 lbs) were dropped onto the glass from approximately 1 m. The weights smashed the glass. The glass was then coated in a 10% water gel (made as described in Example 1 albeit a 10 wt % rather than 35 wt % gel) shaped to comprise a plurality of hemispherical protrusions upwards from the glass. The tests were repeated and the glass coated with shaped gels took multiple hits (at least 3) before failure.

The invention claimed is:

1. A pressure impulse mitigating barrier comprising a water gel layer and a layer comprising a plurality of disruptor particles, wherein said water gel comprises water and a gel selected from the group consisting of gelatin, gellan gum gels, poly(gamma-benzyl-Lglutamate), agar, collagen, protein gels, polysaccharide gels, keratin gels, hydrogels, ormosils, sol-gels, hydrophilic polymer gels, glycoprotein gels, carrageenans, pectins, chitosan, alginates, seed gums, an egg protein gel, Gelacrimide gels and a mixture thereof, wherein said water gel is cross-linked by a cross-linking agent, and wherein the pressure impulse mitigating barrier additionally comprises a polymer layer, a metal layer, a ceramic layer, a fabric layer, a fiberglass layer, a dilatant layer, graphite layer, graphite epoxy composite layer, glass/epoxy composites, cyanate ester resin composites or mixtures of such layers.

2. A pressure impulse mitigating barrier comprising a water gel layer and a layer comprising a plurality of disruptor particles, wherein said water gel comprises water and a gel selected from the group consisting of gelatin, gellan gum gels, poly(gamma-benzyl-Lglutamate), agar, collagen, protein gels, polysaccharide gels, keratin gels, hydrogels, ormosils, sol-gels, hydrophilic polymer gels, glycoprotein gels, carrageenans, pectins, chitosan, alginates, seed gums, an egg protein gel, Gelacrimide gels and a mixture thereof, and wherein said water gel is a water gel sheet, said sheet comprising an array of protrusions formed from said water gel; and a layer comprising a plurality of disruptor particles.

3. The barrier as claimed in claim 1 wherein said water gel comprises gelatin and water.

4. The barrier as claimed in claims 1 wherein the concentration of gel in said water gel is 20 to 35% wt.

5. A pressure impulse mitigating barrier comprising a water gel layer and a layer comprising a plurality of disruptor particles, wherein said water gel comprises water and a gel selected from the group consisting of gelatin, gellan gum gels, poly(gamma-benzyl-Lglutamate), agar, collagen, protein gels, polysaccharide gels, keratin gels, hydrogels, ormosils, sol-gels, hydrophilic polymer gels, glycoprotein gels, carrageenans, pectins, chitosan, alginates, seed gums, an egg protein gel, Gelacrimide gels and a mixture thereof, wherein said water gel is cross-linked by a cross-linking agent and wherein said cross-linking agent is of general formula (I)

$$X\text{-}Sp\text{-}X \qquad (I)$$

wherein each X independently represents the residue of: an aldehyde, an ester, an amine, a thiol, a hydroxyl, an acid halide, epoxide or a vinyl and Sp is a spacer group comprising a chain of 1 to 100 atoms in its backbone.

6. A pressure impulse mitigating barrier comprising a water gel layer and a layer comprising a plurality of disruptor particles, wherein said water gel comprises water and a gel selected from the group consisting of gelatin, gellan gum gels, poly(gamma-benzyl-Lglutamate), agar, collagen, protein gels, polysaccharide gels, keratin gels, hydrogels, ormosils, sol-gels, hydrophilic polymer gels, glycoprotein gels, carrageenans, pectins, chitosan, alginates, seed gums, an egg protein gel, Gelacrimide gels and a mixture thereof, wherein said water gel is cross-linked by a cross-linking agent and wherein said cross-linking agent is of general formula (II)

$$(X\text{-}Sp)_nY \qquad (II)$$

wherein X represents the residue of: an aldehyde, an ester, an amine, a thiol, a hydroxyl, an acid halide, epoxide or a vinyl and Sp is a spacer group comprising a chain of 1 to 100 atoms in its backbone, Y is a carbon atom, C—H or a heteroatom and n is 3 to 5.

7. The barrier as claimed in claim 5 or 6 wherein all groups X are the same and represent the residue of an ester.

8. The barrier as claimed in claim 5 or 6 wherein said group Sp is a $C_{1-20}$ alkylene chain.

9. A pressure impulse mitigating barrier comprising a water gel layer and a layer comprising a plurality of disruptor particles, wherein said water gel comprises water and a gel selected from the group consisting of gelatin, gellan gum gels, poly(gamma-benzyl-Lglutamate), agar, collagen, protein gels, polysaccharide gels, keratin gels, hydrogels, ormosils, sol-gels, hydrophilic polymer gels, glycoprotein gels, carrageenans, pectins, chitosan, alginates, seed gums, an egg protein gel, Gelacrimide gels and a mixture thereof, wherein said water gel is cross-linked by a cross-linking agent, wherein said cross linking agent comprises an N-hydroxysuccinimide ester.

10. A pressure impulse mitigating barrier comprising a water gel layer and a layer comprising a plurality of disruptor particles, wherein said water gel comprises water and a gel selected from the group consisting of gelatin, gellan gum gels, poly(gamma-benzyl-Lglutamate), agar, collagen, protein gels, polysaccharide gels, keratin gels, hydrogels, ormosils, sol-gels, hydrophilic polymer gels, glycoprotein gels, carrageenans, pectins, chitosan, alginates, seed gums, an egg protein gel, Gelacrimide gels and a mixture thereof, wherein said water gel is cross-linked by a cross-linking agent, wherein the cross-linking agent is a sebacic acid ester, trissuccinimdyl aminotriacetate (TSAT), beta-tris(hydroxylmethylphosphino) propionic acid (THPP) or imidoester or avidin-biotin.

11. The barrier as claimed in claim 2 wherein said protrusions are hemispherical.

12. The barrier as claimed in claim 1 wherein said disruptor particles are ceramic spheres.

13. The barrier as claimed in claim 1 comprising a dilatant layer containing a polyethylene glycol layer.

14. A method for protecting an entity from the effects of an explosion or from the effects of contact with a projectile comprising covering at least a part of said entity in a barrier as claimed in claim 1.

15. The method as claimed in claim 14 which additionally protects said entity from fire or from biological, chemical or radiological contamination.

16. The method of claim 14, wherein the entity is a ship or a vehicle.

17. The barrier as claimed in claim 1, wherein said cyanate ester is an aromatic cyanate ester.

* * * * *